(12) United States Patent
Schulz et al.

(10) Patent No.: US 7,923,944 B2
(45) Date of Patent: Apr. 12, 2011

(54) SINGLE PROCESSOR DUAL MOTOR CONTROL

(75) Inventors: Steven E. Schulz, Torrance, CA (US); Terry Murrell, San Pedro, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 978 days.

(21) Appl. No.: 11/758,941

(22) Filed: Jun. 6, 2007

(65) Prior Publication Data

US 2008/0303470 A1 Dec. 11, 2008

(51) Int. Cl.
H02P 5/00 (2006.01)

(52) U.S. Cl. .................. 318/66; 318/34; 318/53; 318/68

(58) Field of Classification Search .................. 318/34, 318/49, 51, 53, 59, 66, 67, 68, 78, 80, 82, 318/83, 110, 111, 112
See application file for complete search history.

(56) References Cited

U.S. PATENT DOCUMENTS

| | | | |
|---|---|---|---|
| 4,196,376 A * | 4/1980 | Harvest et al. | 318/78 |
| 4,506,378 A | 3/1985 | Noso et al. | |
| 5,818,678 A | 10/1998 | Berg et al. | |
| 6,078,154 A | 6/2000 | Manlove et al. | |
| 6,262,546 B1 | 7/2001 | Draves et al. | |
| 6,583,591 B2 * | 6/2003 | Echols et al. | 318/112 |
| 6,732,708 B2 | 5/2004 | Nishizawa et al. | |
| 6,834,640 B2 | 12/2004 | Nishizawa et al. | |
| 6,979,986 B2 | 12/2005 | Liegeois | |
| 7,425,806 B2 * | 9/2008 | Schnetzka et al. | 318/41 |
| 7,629,756 B2 | 12/2009 | Murrell et al. | |
| 7,696,715 B2 * | 4/2010 | Fisher et al. | 318/802 |
| 2005/0280378 A1 * | 12/2005 | Suzuki | 318/80 |
| 2008/0143288 A1 | 6/2008 | Iwaji et al. | |
| 2009/0108789 A1 | 4/2009 | Bliley et al. | |

OTHER PUBLICATIONS

Notice of Allowance dated Aug. 3, 2009, issued in U.S. Appl. No. 11/769,817.

* cited by examiner

*Primary Examiner* — Walter Benson
*Assistant Examiner* — Thai Dinh
(74) *Attorney, Agent, or Firm* — Ingrassia Fisher & Lorenz, P.C.

(57) ABSTRACT

A motor control processor is provided for motor phase current sampling of multiple variable frequency controlled electric motors, and includes an analog-to-digital (A/D) converter and a controller. The A/D converter has multiple analog inputs and generates a digital output signal in response to the multiple analog inputs. The controller is coupled to the A/D converter and determines a maximum desired switching frequency for a first one of the multiple variable frequency controlled electric motors. The controller further selects a base period in response to the maximum desired switching frequency and defines a phase shift time delay as a fraction of the base period so the controller may control the multiple analog inputs of the A/D converter to sample motor phase currents of each of the multiple variable frequency controlled electric motors at sample times determined by the controller in response to the base period and the phase shift time delay.

20 Claims, 2 Drawing Sheets

__US 7,923,944 B2__

SINGLE PROCESSOR DUAL MOTOR CONTROL

TECHNICAL FIELD

The present invention generally relates to electric motors, and more particularly relates to motor control processors for multiple motors and their operation.

BACKGROUND OF THE INVENTION

Utilizing multiple microprocessors for multiple motor control processors controlling multiple motors is problematic in that coordination and communication between the motor control processors adds additional levels of complexity and utilizes additional resources and computation time, as well as requiring the establishment of some hierarchy mechanisms for the processors. Yet, utilizing a single motor control processor for multiple motor control presents difficulty in that each motor may use a different switching frequency.

While motor control circuits have been disclosed which use variable switching frequencies with a single motor controller to increase available execution time for additional low speed motor control algorithms or to reduce switching losses, a multiple motor system presents additional difficulties. For example, implementing a method to control two variable frequency motor drives within a single processor requires providing continuously variable switching frequencies for both controllers. Unwanted delays, however, may be introduced when the required sampling times overlap.

Accordingly, it is desirable to provide a method for utilization of a single motor control processor for controlling two or more motor controllers in a multiple motor system. In addition, it is desirable to provide a variable frequency control method for two motor controllers in one motor control processor which avoids unwanted delays in current sampling. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A motor control processor is provided for motor phase current sampling of multiple variable frequency controlled electric motors. The motor control processor comprises an analog-to-digital (A/D) converter and a controller. The A/D converter has multiple analog inputs and generates a digital output signal in response to the multiple analog inputs. The controller is coupled to the A/D converter and determines a maximum desired switching frequency for a first one of the multiple variable frequency controlled electric motors. The controller further selects a base period in response to the maximum desired switching frequency and defines a phase shift time delay as a fraction of the base period so that the controller may control the multiple analog inputs of the A/D converter to sample motor phase currents of each of the multiple variable frequency controlled electric motors at sample times determined by the controller in response to the base period and the phase shift time delay.

A method is provided for motor phase current sampling of multiple variable frequency controlled electric motors. The method includes determining a maximum desired switching frequency for a first one of the multiple variable frequency controlled electric motors, selecting a base period in response to the maximum desired switching frequency, defining a phase shift time delay as a fraction of the base period, and sampling motor phase currents of each of the multiple variable frequency controlled electric motors at sample times determined in response to the base period and the phase shift time delay.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
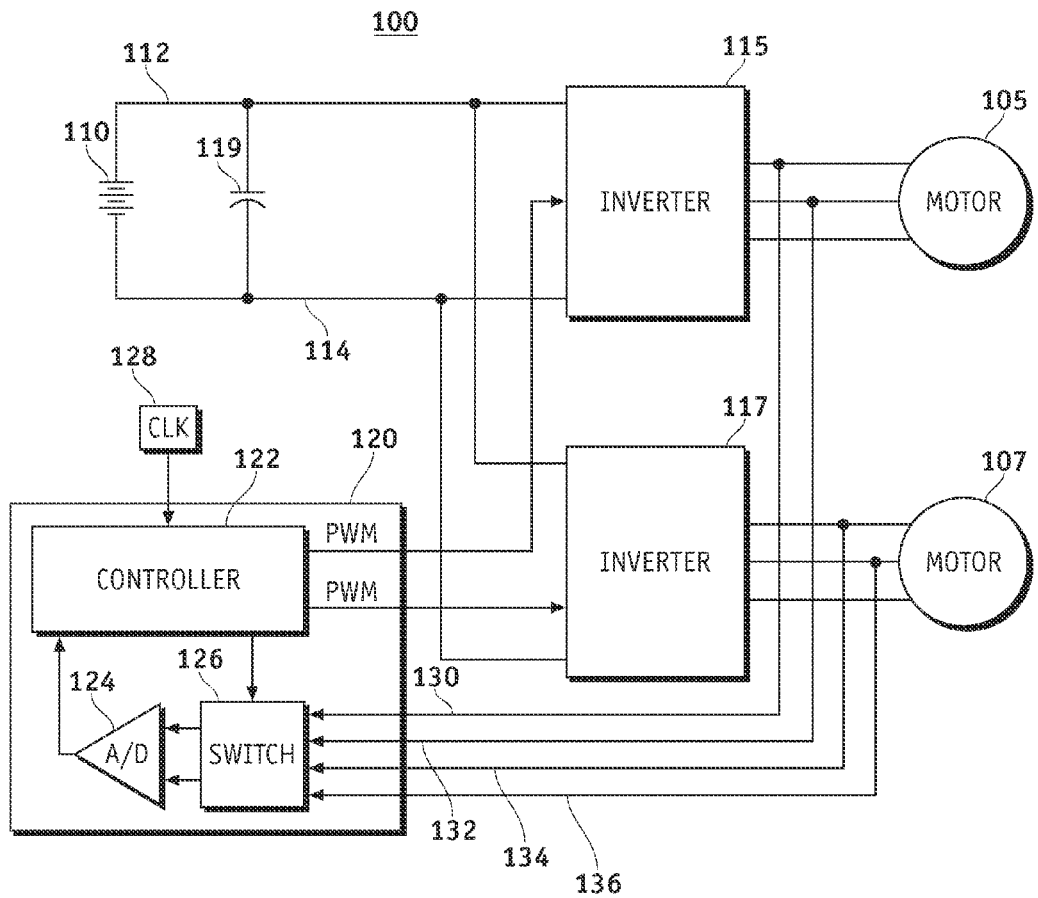
FIG. 1 depicts a block diagram of a dual electric motor system in accordance with an embodiment of the present invention.

Referring to FIG. 1, a multiple electric motor system 100 in accordance with an embodiment of the present invention, such as a dual electric motor system for a hybrid vehicle propulsion system, includes a first variable speed electric motor 105 and a second variable speed electric motor 107. A direct current (DC) power source 110, such as a battery or a fuel cell, utilizes a high voltage node 112 and a low voltage node 114 to provide DC current to a first inverter 115 for driving the first motor 105. In addition, the power source 110 also provides DC current to a second inverter 117 for driving the second motor 107. A capacitor 119 is connected between the high voltage node 112 and the low voltage node 114 for providing a low impedance path for alternating current (AC) to flow.

The electric motors 105, 107 are variable frequency controlled electric motors, wherein the individual motor speeds may be independent and the switching frequency of the inverters 115, 117 may also be independently variable. A maximum desired switching frequency is associated with either one or both of the inverters 115, 117.

In order to reduce cost and component count, it is desirable to utilize a single motor control processor to control the two separate inverters 115, 117. In accordance with the embodiment of the present invention, the multiple electric motor system 100 includes a single motor control processor 120, such as a microprocessor. The motor control processor 120 includes a controller 122 which generates pulse width modulated (PWM) control signals in a manner well-known to those skilled in the art to regulate the fundamental component of the motor phase voltage to a desired amplitude, phase, and frequency. The controller 122 is coupled to the inverters 115, 117 to provide the PWM control signals to switching elements thereof.

The motor control processor 120 also includes an internal analog-to-digital (A/D) converter 124. To minimize costs of the electric motor system 100 by not including additional components or circuitry, the internal A/D converter 124 is utilized for sampling phase currents at the input to the inverters 115, 117 and generating therefrom a digital signal as a phase current sense signal, the phase current sense signal being provided to the controller 122.

While each of the two inverters 115, 117 requires two of its phase currents to be sampled simultaneously (i.e., a total of four signals to be sampled, two signals 130, 132 from the two phase currents to the motor 105 and two signals 134, 136 from the two phase currents to the motor 107), the A/D converter 124 has only two channels which can be simultaneously sampled. Therefore, in accordance with the present invention, the motor control processor 120 also includes a switching element 126 for receiving the four phase currents to be sampled and, operating under the control of the controller 122, providing two input signals at any one time to the two channel inputs of the A/D converter 124.

The controller 122 provides variable frequency control of the two inverters 115, 117 in one motor control processor 120, while avoiding any unwanted delays in the current sampling by the single A/D converter 124 internal to the motor control processor 120. In addition to providing two of the four signals 130, 132, 134, 136 to the input of the A/D converter 124 at any one time to sample the phase currents (i.e., the two sets of the four signals 130, 132, 134, 136) associated with each motor 105, 107 simultaneously, the phase currents are sampled with a fixed phase relation to the PWM signals provided from the controller 122 to the inverters 115, 117.

The fixed phase relation to the PWM control signals is determined by the controller 122 in response to the cycle of the PWM signals. Since the PWM signals induce an AC harmonic ripple on the phase currents, it is preferable to sample the fundamental component of each phase current while ignoring the AC ripple component. As the AC ripple component passes through zero at the start and center points of each cycle of the PWM signal, it is preferable to sample the PWM signal at either the start or the midpoint of each cycle. In accordance with the embodiment of the present invention, the phase currents are sampled at the start of a cycle of the PWM signal thereby effectively providing the average value of the phase current for that PWM cycle. The phase current sense signal values generated in response to the sampled phase current values and provided to the controller 122 from the A/D converter 124 are utilized by the controller 122 for motor control calculations to be performed during upcoming computational periods.

While the cycle of the PWM signals can provide a basis for determining the sample times of the phase currents, any advance or delay in the phase current sample times with respect to the cycle of the PWM signal can introduce aliasing or errors into the phase current sense signal provided to the controller 122. Since the PWM signal also induces an AC harmonic ripple on the input current of each inverter, the switch element 126 must be operated under the control of the controller 122 to phase shift the PWM signals provided to the inverters 115, 117 to initiate current ripple cancellation. The sum of the input currents is the current flowing in the high voltage branch 112. This current has a DC component (i.e., an average current value) and an AC component. A large portion of the AC component flows through the capacitor 119 to the low voltage node 114. Phase shifting the input currents flowing into the two inverters 115, 117 produces a cancellation effect on the AC components of the phase currents, thereby reducing the AC current flowing in the branch 112 and reducing the AC current flowing through the capacitor 119 and the stress therein.

The controller 122 must also accommodate the switching frequencies of the inverters 115, 117 when determining the phase current sample times. The switching frequency of the inverters 115, 117 is often reduced at low motor speeds to minimize switching losses and/or allow additional controller 122 execution time. Conversely, at high motor speeds the switching frequency is often increased to provide adequate pulse ratio to maintain controllability, where pulse ratio is defined as the ratio of the switching frequency to the motor fundamental electrical frequency. Accordingly, the switch element 126 must be operated under the control of the controller 122 to sample the phase-shifted phase currents at sample times having a fixed phase relation to the PWM signals provided from the controller 122 to the inverters 115, 117 in order to sample the phase currents in a fixed phase relation with speed of the variable speed motors 105, 107 wherein the sample times are calculated to fall within ideal sample time portions of the cycle of each of the phase-shifted phase current.

If the controller 122 signals the switch element 126 to shift in time the two sample times, there will not be any conflict between the sample times. However, with two totally independent switching frequencies, it is possible that sample instants calculated by the controller 122 line up at approximately the same time instant. In such a case, it is impossible for the A/D converter 124 to sample all four phase currents simultaneously. While priority could be given to one set of inverter phase currents, thereby delaying the other set of inverter phase currents' sample point from its ideal sample instant, current sampling error would result and feedback signals would be corrupted and the motor control performance of the inverters 115, 117 would be degraded. Though the current sampling error induced in the non-ideal sample instant might be compensated for, such compensation would require significant processor computational power. Accordingly, in accordance with the embodiment of the present invention, the controller 122 advantageously guarantees that sample instants of signals 130, 132 will never overlap with sample instants of signals 134, 136 despite the independent variable frequency operation of the motors 105, 107 of the multiple electric motor system 100.

Since the A/D converter 124 has a finite conversion time during which additional samples may not be taken, the controller 122 also utilizes a clock signal generated by a clock 128 for calculation of the phase current sample times in order to accommodate the known finite conversion time associated with the A/D converter 124 after each phase current set sample time that additional phase current set samples may not be taken.

Figure 2:
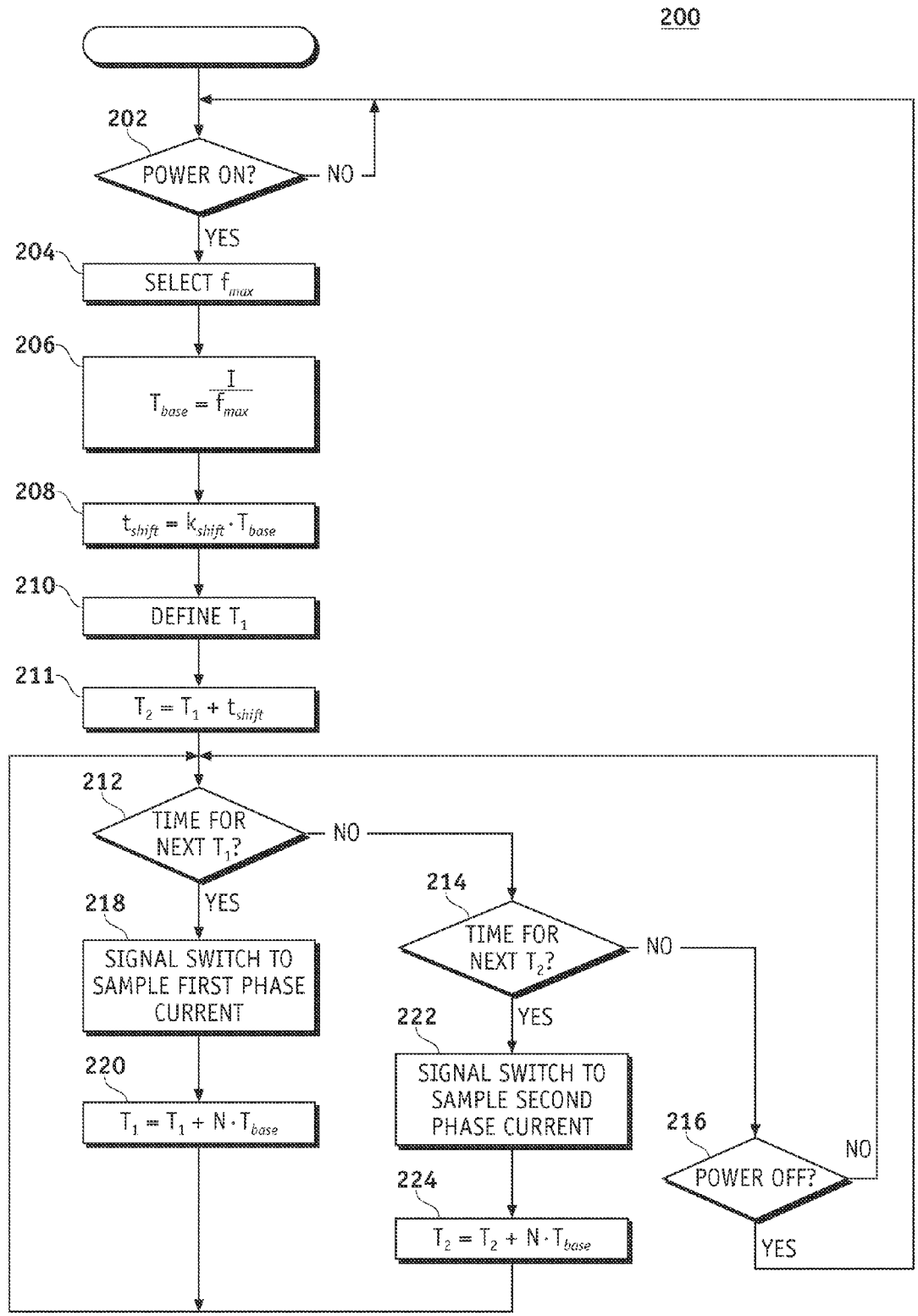
FIG. 2 depicts a flowchart of the operation of a motor control processor of the dual electric motor system of FIG. 1 in accordance with the embodiment of the present invention.

Therefore, in accordance with the embodiment of the present invention, the controller 122 calculates the sample times of the phase currents and provides appropriate sample time signals to the switch element 126 for controlling the provision of the phase currents to the A/D converter 124 for sampling thereof. Referring to FIG. 2, a flowchart 200 of the operation of the controller 122 in accordance with the embodiment of the present invention initially determines whether the multiple electric motor system 100 has been powered on 202.

When the controller 122 determines that the electric motor system 100 has been powered on 202, a maximum desired switching frequency ($f_{max}$) is selected 204 from a maximum one of the switching frequencies for one of the motor control inverters 115, 117. Next, a base period ($T_{base}$) is defined 206 as the period at the maximum switching frequency ($1/f_{max}$). For example, for a maximum switching frequency of 12 kHz, the base period would be 83.33 μsec.

Then, a phase shift time delay ($t_{shift}$) is defined 208 as a fractional amount of the base period (i.e., $t_{shift}=k_{shift}\times T_{base}$, where $0<k_{shift}<1$). The value of $k_{shift}$ must provide sufficient separation between the two sample instants to allow the A/D converter 124 to sample and complete the conversion for one inverter 115 prior to starting the sampling for the second inverter 117. A value of one-half ($k_{shift}=\frac{1}{2}$) provides maximum separation while maximizing the cancellation quality when both inverters 115, 117 are operating at the maximum desired frequency and is introduced as a time delay between the start time of the two motor control sample times.

Typically, both inverters 115, 117 will be operating at the maximum desired switching frequency ($f_{max}$) a majority of the time and when operating at $f_{max}$, the phase shift of the cycles of the PWM signals can help reduce the AC current stress placed upon the capacitor 119 because cancellation occurs due to the one hundred eighty degree (180°) phase shift in AC ripple currents feeding the capacitor 119 when both inverters 115, 117 run at the same switching frequency.

Next, the controller 122 defines 210 the first sample time for the first phase current ($T_1$) (i.e., the phase current of the signals 130, 132 of the first inverter 115). Next, the controller 122 determines 211 the first sample time for the second phase current ($T_2$) (i.e., the phase current of the signals 134, 136 of the second inverter 117) in response to the first sample time and the phase shift time delay ($T_2=T_1+t_{shift}$) 211.

Processing of the controller 122 then determines whether it is time for the first phase current sample time 212, time for the second phase current sample time 214, or time to power down 216. The time to power down is determined 216 in response to operational conditions (e.g., turning the power off to the electric motor system 100) well known to those skilled in the art.

When it is time for the first phase current sample time 212, the controller 122 provides 218 a signal to the switch 126 to couple signals 130, 132 from the first inverter phase currents to the inputs of the A/D converter 124. The controller 122 then calculates the next sample time for the first inverter phase currents 220 in response to a switching frequency between switching times that is an integer multiple (N) of the base period (e.g., $T_1=T_1+T_{sw}$, where $T_{sw}=N\times T_{base}$). Table 1 below provides a list of possible switching frequencies when a maximum switching frequency of 12 kHz is employed. The table stops at 2 kHz, but the frequency can be made arbitrarily low by extending the sample period with additional integer increments of $T_{base}$. The proposed technique allows a wide range of selectable switching frequencies, while guaranteeing the synchronous sampling of signals without unwanted delay times. An additional benefit includes reduced capacitor 119 stresses due to ripple current cancellation.

TABLE 1

| Ts [usec] | fsw [kHz] |
|---|---|
| 83.33 | 12.0 |
| 166.67 | 6.0 |
| 250.00 | 4.0 |
| 333.33 | 3.0 |
| 416.67 | 2.4 |
| 500.00 | 2.0 |

After calculating the next sample time for the first phase current 220, processing returns to determine whether it is time for the next first phase current sample time 212, time for the next second phase current sample time 214, or time to power down 216.

When it is time for the second phase current sample time 214, the controller 122 provides 222 a signal to the switch 126 to couple signals 134, 136 from the second inverter phase currents to the inputs of the A/D converter 124. The controller 122 then calculates the next sample time for the second phase current 224. The next sample time for the second phase current is also calculated 224 in response to a switching frequency between switching times that is an integer multiple of the base period (i.e., $T_2=T_2+T_{sw}$, where $T_{sw}=N\times T_{base}$). After calculating the next sample time for the second phase current 224, processing returns to determine whether it is time for the next first phase current sample time 212, time for the next second phase current sample time 214, or time to power down 216.

Utilizing the switching times ($T_{sw}$) for calculation of both sample times and the phase shift time delay ($t_{shift}$) for the second phase current sample times in accordance with the embodiment of the present invention provides for variable frequency operation while guaranteeing constant separation of the A/D converter 124 sample instants of the two independent inverters 115, 117 so that the individual sample instants will never overlap.

Figure 3:
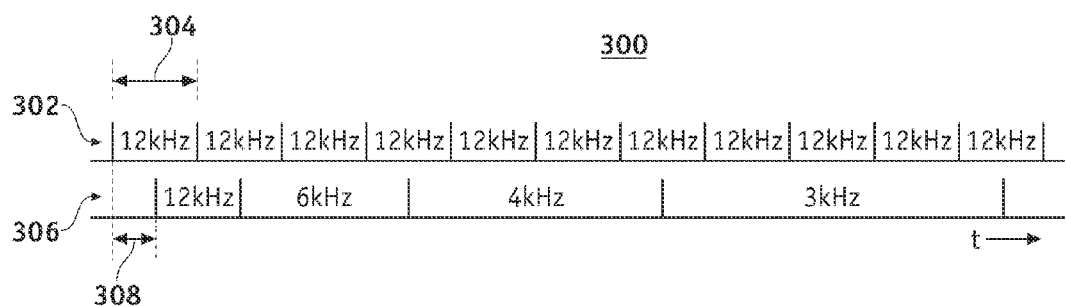
FIG. 3 depicts a timing diagram of the variable frequency controlled sample times in accordance with the embodiment of the present invention.

Referring to FIG. 3, a timing diagram 300 illustrates sampling times and switching frequencies defined by the operation of the controller 122 in accordance with the embodiment of the present invention. The first phase current sampling times of the signals 130, 132 is shown on line 302 with a fixed switching frequency of 12 kHz, where 12 kHz is also the base period ($T_{base}$) 304. While first phase current sampling times are shown in the timing diagram 300 as having a fixed switching frequency of 12 kHz, it is well-known to those skilled in the art that the switching frequency could be varied to any integer multiple of the base period (i.e., $N\times T_{base}$) in accordance with the embodiment of the present invention without violating the separation of the A/D converter 124 sampling instants.

The second phase current sampling times of the signals 134, 136 is shown on line 306 with a phase shift time delay ($t_{shift}$) 308 before the initial second inverter phase current sampling times and switching frequencies between subsequent sampling times of integer multiples of the base period ($T_{sw}=N\times T_{base}$). It can be seen from the timing diagram 300 that if the switching frequencies for both the first phase current sampling times 302 and the second phase current sampling times 306 switch at the period of the maximum switching frequency (i.e., 12 kHz) continuously, the sample instants will maintain constant time separation due to the phase shift time delay ($t_{shift}$) 308. Even when the switching period of the second phase current sampling times 306 are varied in accordance with integer multiples of the base period ($T_{base}$), the sample instants retain at least the minimum amount of separation.

Thus it can be seen that the embodiment of the present invention enables two variable frequency motor controls, such as the inverters 115, 117, to be operated under the control of a single motor control processor 120 using its internal limited input A/D converter 124 while guaranteeing synchronous phase current sampling with no unwanted delays and providing for reduced capacitor 119 stresses through current cancellation when both inverters 115, 117 are running the maximum switching frequency ($f_{max}$). As a result, both the cost of the multiple electric motor system 100 and the component part count thereof will be reduced.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for motor phase current sampling of multiple variable frequency controlled electric motors comprising the steps of:
   determining a maximum desired switching frequency for a first one of the multiple variable frequency controlled electric motors;
   selecting a base period in response to the maximum desired switching frequency;
   defining a phase shift time delay as a fraction of the base period; and
   sampling motor phase currents of each of the multiple variable frequency controlled electric motors at sample times determined in response to the base period and the phase shift time delay.

2. The method in accordance with claim 1 wherein the step of sampling motor phase currents comprises the step of sampling motor phase currents of one of the multiple variable frequency controlled electric motors at sample times separated from other sample times of the one of the multiple variable frequency controlled electric motors by integer multiples of the base period.

3. The method in accordance with claim 1 wherein the multiple variable frequency controlled electric motors comprises a first variable frequency controlled electric motor and a second variable frequency controlled electric motor, and wherein the step of determining a maximum desired switching frequency comprises the step of determining a maximum desired switching frequency for the first variable frequency controlled electric motor.

4. The method in accordance with claim 3 wherein the step of sampling motor phase currents comprises the step of sampling motor phase currents of the first and the second variable frequency controlled electric motors at sample times separated by integer multiples of the base period, wherein an initial one of the sample times for the second variable frequency controlled electric motor occurs a phase shift time delay after an initial one of the sample times for the first variable frequency controlled electric motors.

5. The method in accordance with claim 1 wherein the step of defining a phase shift time delay comprises the step of defining a phase shift time delay as one half of the base period.

6. The method in accordance with claim 1 wherein the step of sampling motor phase currents comprises the step of sampling motor phase currents of each of the multiple variable frequency controlled electric motors by an analog-to-digital (A/D) converter.

7. The method in accordance with claim 6 wherein the A/D converter is a dual input A/D converter, and wherein the step of sampling motor phase currents of one of the multiple variable frequency controlled electric motors comprises the step of sampling two signals of one of the motor phase currents by the dual input A/D converter at each of the sample times.

8. A motor control processor for motor phase current sampling of multiple variable frequency controlled electric motors comprising:
   an analog-to-digital (A/D) converter having multiple analog inputs and generating a digital output signal in response thereto; and
   a controller coupled to the A/D converter and determining a maximum desired switching frequency for a first one of the multiple variable frequency controlled electric motors, the controller further selecting a base period in response to the maximum desired switching frequency and defining a phase shift time delay as a fraction of the base period, wherein the controller controls the multiple analog inputs of the A/D converter for sampling motor phase currents of each of the multiple variable frequency controlled electric motors at sample times determined by the controller in response to the base period and the phase shift time delay.

9. The motor control processor in accordance with claim 8 wherein the controller controls the multiple analog inputs of the A/D converter for sampling motor phase currents of each of the multiple variable frequency controlled electric motors at sample times separated by integer multiples of the base period.

10. The motor control processor in accordance with claim 8 wherein the multiple variable frequency controlled electric motors comprises a first variable frequency controlled electric motor and a second variable frequency controlled electric motor, and wherein the controller determines the maximum desired switching frequency for the first variable frequency controlled electric motor.

11. The motor control processor in accordance with claim 10 wherein the controller controls the multiple analog inputs of the A/D converter for sampling motor phase currents of the first and the second variable frequency controlled electric motors at sample times separated by integer multiples of the base period, wherein an initial one of the sample times for the second variable frequency controlled electric motor occurs a phase shift time delay after an initial one of the sample times for the first variable frequency controlled electric motors.

12. The motor control processor in accordance with claim 8 wherein the controller defines the phase shift time delay as one half of the base period.

13. The motor control processor in accordance with claim 8 wherein the A/D converter is a dual input A/D converter including two analog inputs, the motor control processor further comprising a switching element coupled to the controller and the two analog inputs of the A/D converter, and wherein the controller controls the switching element to connect the two analog inputs of the A/D converter to two signals of one of the motor phase currents of one of the multiple variable frequency controlled electric motors at each of the sample times for sampling of the motor phase currents by the dual input A/D converter.

14. The motor control processor in accordance with claim 8 wherein the A/D converter provides the digital output signal to the controller.

15. A multiple electric motor system comprising:
   a first variable frequency controlled electric motor having a maximum desired switching frequency associated therewith;
   a second variable frequency controlled electric motor;
   a clock generating a timing signal; and
   an analog-to-digital (A/D) converter having multiple analog inputs coupled to the first and second variable frequency controlled electric motors and generating a digital output signal in response to the multiple analog inputs, wherein the A/D converter samples motor phase currents of the first variable frequency controlled electric motor at first sample times determined in response to the timing signal and a base period and samples motor phase currents of the second variable frequency controlled electric motor at second sample times determined in response to the timing signal, the base period and a phase shift time delay, wherein the base period is selected in response to the maximum desired switching frequency of the first variable frequency controlled electric motor and the phase shift time delay is defined as a fraction of the base period.

16. The multiple electric motor system in accordance with claim 15 wherein the first sample times are each separated by integer multiples of the base period and wherein the second sample times are also each separated by integer multiples of the base period.

17. The multiple electric motor system in accordance with claim 15 wherein an initial one of the second sample times occurs a phase shift time delay after an initial one of the first sample times.

18. The multiple electric motor system in accordance with claim 15 wherein the A/D converter is a dual input A/D converter including two analog inputs, the multiple electric motor system further comprising a switching element coupled between the motor phase currents and the two analog inputs of the A/D converter and receiving a signal from the controller for coupling two signals of a motor phase current of the first or the second multiple variable frequency controlled electric motors to the two analog inputs of the A/D converter at each of the sample times.

19. The multiple electric motor system in accordance with claim 15 further comprising a motor control processor for controlling the first and the second variable frequency controlled electric motors in response to the digital output signal of the A/D converter, wherein the motor control processor is also coupled to the clock and the multiple analog inputs of the A/D converter for controlling the multiple analog inputs of the A/D converter for sampling the motor phase currents of the first and the second multiple variable frequency controlled electric motors at the respective first and second sample times.

20. The multiple electric motor system in accordance with claim 19 wherein the A/D converter is an internal A/D converter of the motor control processor.

* * * * *